(12) United States Patent
Sampson

(10) Patent No.: US 8,828,134 B2
(45) Date of Patent: *Sep. 9, 2014

(54) PRESSURE IMPULSE MITIGATION

(75) Inventor: Tim Sampson, Auckland (NZ)

(73) Assignee: Flexiblast Pty Ltd., Woolloongabba (AU)

( * ) Notice: Subject to any disclaimer, the term of this patent is extended or adjusted under 35 U.S.C. 154(b) by 2045 days.

This patent is subject to a terminal disclaimer.

(21) Appl. No.: 11/912,661

(22) PCT Filed: Apr. 25, 2006

(86) PCT No.: PCT/GB2006/001494
§ 371 (c)(1),
(2), (4) Date: May 27, 2008

(87) PCT Pub. No.: WO2006/114597
PCT Pub. Date: Nov. 2, 2006

(65) Prior Publication Data
US 2009/0104422 A1    Apr. 23, 2009

(30) Foreign Application Priority Data
Apr. 28, 2005  (GB) .................................. 0508662.4
Jan. 16, 2006  (GB) .................................. 0600813.0

(51) Int. Cl.
C08L 89/00    (2006.01)
F41H 5/02     (2006.01)

(52) U.S. Cl.
USPC ................. 106/160.1; 89/36.02; 428/332

(58) Field of Classification Search
USPC ............... 89/36.02; 106/160.1; 428/332, 334
See application file for complete search history.

(56) References Cited

U.S. PATENT DOCUMENTS

| 3,202,556 A | * | 8/1965 | Chrisp ............................ 149/20 |
| 3,301,723 A | * | 1/1967 | Chrisp ............................ 149/20 |
| 3,398,007 A |   | 8/1968 | Pillersdorf et al. |
| 4,008,110 A | * | 2/1977 | Machacek ....................... 149/46 |
| 4,246,146 A | * | 1/1981 | Wood et al. ..................... 524/14 |
| 5,935,593 A | * | 8/1999 | Ron et al. ....................... 424/423 |
| 7,861,637 B2 | * | 1/2011 | Leivesley ..................... 89/36.02 |
| 2009/0104422 A1 |   | 4/2009 | Sampson |

FOREIGN PATENT DOCUMENTS

| EP | 0 251 606 A | 1/1988 |
| EP | 0 465 442 A2 | 1/1992 |
| EP | 0 488 465 A1 | 6/1992 |
| EP | 1 229 298 A1 | 8/2002 |
| FR | 2 459 956 | 1/1981 |
| GB | 2 100 845 A | 1/1983 |
| GB | 2 262 885 A | 7/1993 |
| WO | WO 02/29351 A1 | 4/2002 |
| WO | WO 2004/044520 A | 5/2004 |
| WO | WO 2005/035607 A1 | 4/2005 |
| WO | WO 2005/052500 A | 5/2005 |
| WO | WO 2005/100903 A | 10/2005 |

OTHER PUBLICATIONS

Partial European Search Report dated Jun. 23, 2010.

\* cited by examiner

*Primary Examiner* — Lynda Salvatore
(74) *Attorney, Agent, or Firm* — Knobbe, Martens Olson & Bear, LLP

(57) ABSTRACT

A method for protecting an entity from the effects of an explosion or from the effects of contact with a projectile by covering at least a part of the entity in a barrier which includes a cross-linked water gel.

38 Claims, 1 Drawing Sheet

Figure 1
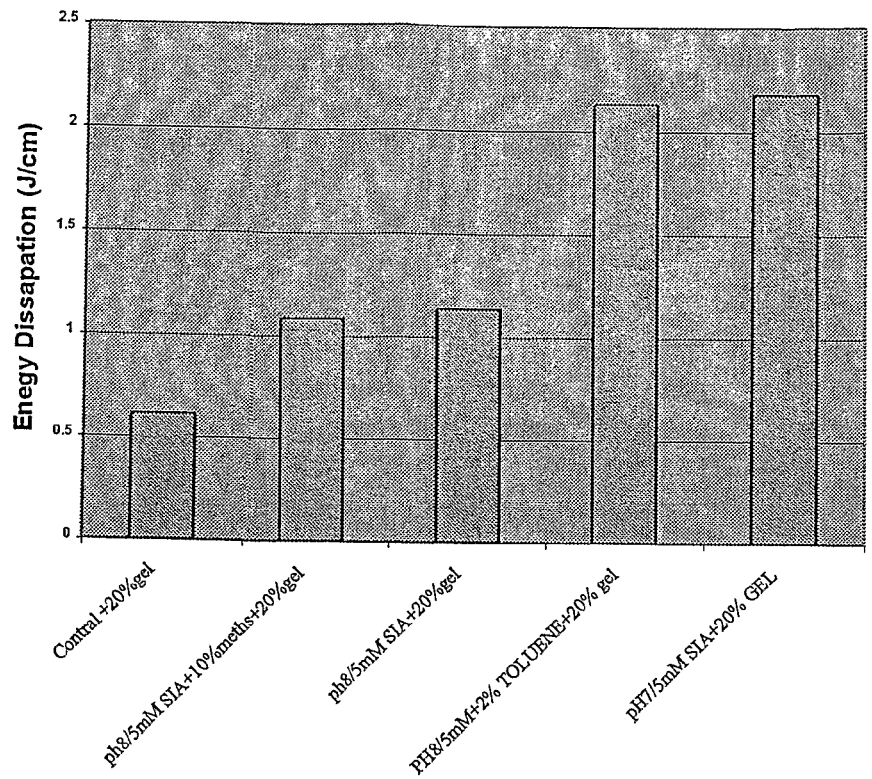
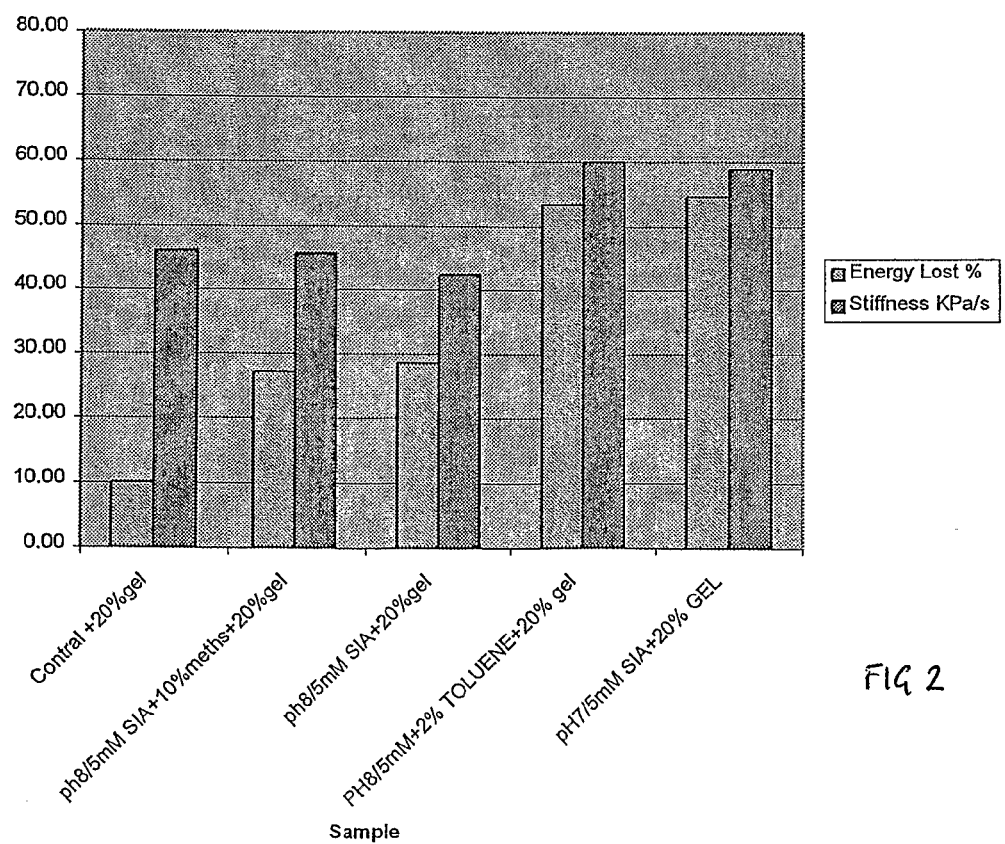
FIG 2

PRESSURE IMPULSE MITIGATION

RELATED APPLICATIONS

This application is a U.S. National Phase of International Application No. PCT/GB2006/001494, filed Apr. 26, 2006, designating the U.S. and published in English on Nov. 2, 2006, as WO 2006/114597, which claims the benefit of British Application No. GB 0508662.4, filed Apr. 28, 2005 and British Application No. GB 0600813.0, filed Jan. 16, 2006.

FIELD OF THE INVENTION

This invention relates to a new material to be used as a pressure mitigant, e.g. as a protective barrier on or in place of windows. In particular, the invention relates to the use of cross-linked water gels to form a material which can mitigate the consequences of an explosion and damage caused by projectiles.

BACKGROUND OF THE INVENTION

Since the mid 1990's there has been an increase in the use of explosives by criminal organisations against civilian and military targets throughout the World. Their use results in death, injury and destruction of property and buildings. Previously, mitigation of explosion relied upon intelligence and police detection to provide warning of impending attack but recent events make it clear that intelligence and police operations alone cannot be relied upon to prevent explosions. Moreover, some explosions are caused simply by accident, e.g. gas or chemical explosions, and it would be useful if the consequences of such accidental explosions could also be minimised.

Conventional construction can give rise to buildings which will withstand many types of impact but it is still difficult to minimise the effects of explosions. Of particular importance and concern are the windows especially in high rise buildings. Windows are a major cause of trauma and injury caused by explosions; the fragmentation of pieces of glass not only causes death but many other permanent injuries such as loss of eyesight, organ trauma etc.

It is well known therefore for buildings and in particular windows to be protected against explosion damage by materials which mitigate their effects.

One option for minimising the problem of glass fragmentation utilises an adhesive film made of a polyester composite material which can be applied to the inside of a window to contain glass fragments. Such films do not however prevent injury caused by fragments of masonry from cladding or from fragments falling from a height.

Certain other elastomeric polymer materials have been suggested for use as building cladding to prevent damage caused by explosions. The elastomer material is a highly ductile polymer that can be sprayed onto building surfaces including windows to prevent injury caused both by flying glass and masonry. The polymer employed is based on a polyurea and may be suitable for use with temporary structures as well as concrete buildings (Polymer materials for structural retrofit, Knox et al, Air Force Research Laboratory). The polymer is not transparent however and its use on windows is not desirable. Moreover, experiments using the polymer have not shown a reduction in pressure effects inside a building.

There are a number of reports of conventional fire fighting foams being employed as pressure mitigants (Journal of Explosives Engineering, Vol 26, No. 3, 1999). Such foams have the additional advantage of preventing fires often associated with explosions. However, the use of these foams requires that the explosive can be surrounded by the foam in a contained environment. Whilst this is possible when the source of an explosion is identified, where an explosion occurs without warning these foams cannot be used. Nor do these foams allow access to an explosive source by persons working to mitigate an accident or defuse a device controlled by criminals.

A somewhat similar system is sold under the trade name Hydrosuppressor. The system involves spraying the explosive or spraying the area in the vicinity of the explosive with water from various angles. Again however, this technique relies on the identification of an existence of a threat of an explosion prior to any explosion taking place.

A more conventional pressure protection system involves coating windows with a woven fabric mesh which acts to catch fragments of glass during any explosion. However, the mesh necessarily obscures the view through the window since it is not transparent. Moreover, the material does not cause any reduction in primary pressure within a building and hence offers no protection against direct pressure effects.

Recently, pressure impulse mitigation has been significantly improved by the use of blast net curtains and by the retrofitting of laminated glass. However, whilst net curtains provide some protection against fragmentation from glass they do not protect building integrity. Also, laminated glass cannot be used higher than about 7 storeys since it falls in total window size, i.e. does not fragment. This is potentially lethal to those in the street below.

There remains a need therefore for novel classes of pressure mitigation materials to be designed, which overcome the limitations of any of the present generation of such materials including but not limited to those described herein, and in particular to provide protection against zero warning explosions. Moreover, with the increase in criminal activity, the use of pressure impulse mitigation materials in construction may become common place and hence there remains a need to devise cheap, non-toxic materials for pressure impulse mitigation.

SUMMARY OF THE INVENTION

The present inventors have surprisingly found that certain cross-linked mixtures of water and gels (from hereon cross-linked water gels) are particularly suitable for use in barriers/shields to prevent damage caused by explosions. The inventor has surprisingly found that water gels can be formed into structures which can withstand significant over-pressures compared with materials currently used in buildings. Without wishing to be limited by theory, it is envisaged that the inherent elasticity of the cross-linked water gel makes it an excellent material for absorbing the shockwave of an explosion whilst retaining its structural integrity. Moreover, the aqueous nature of the water gel ensures that it is also capable of resisting heat and quenching flame, in particular in the immediate aftermath of an explosion.

In addition, it has surprisingly been found that the cross-linked water gels mitigate damage caused by projectiles such as shrapnel or bullets. The water gels are able to absorb and partially redirect the shockwave created by the projectile through their elasticity whilst also acting to slow and potentially stop the projectile via friction effects throughout the gel bulk. The cross-linked water gels therefore also serve to protect against damage from projectiles and are hence of use as bullet proof materials.

Cross-linked water gels are not themselves new. Cross-linked water gels have been used to deliver bio-molecules and pharmaceuticals either in the form of a biologically degradable capsule or in the form of a matrix from which the active molecule is released during proteolysis in vivo. Amongst the most frequently cited cross linking reagents in this regard is glutaraldehyde (pentane-1,5-dial), which has the chemical formula $C_5H_8O_2$ (see Yamamoto et al., (2000) J. Control. Rel. 133-142; Tabata Y., and Yoshito, I., (1989) Pharma Res., Vol 6, 422-427). Iridoids such as genipin have been used to cross link and thereby harden the coating of gelatin based microcapsules (U.S. Pat. No. 5,023,024).

Other naturally occurring water gels have also been reported to have been chemically cross linked. For example, albumin has been reported to have been cross linked with formaldehyde (Akin, H., and Hasirci N., Proc. Am. Chem. Soc. Polym. Div. Polym. Prepr. 36, 384-385 (1995), and Yamada, K., et al, J. Neurosurg. 86, 871, (1997)) and chondroitin sulphate with diaminododecane catalysed by dicyclohexycarbodiimide (Rubinstein, A., Naker, D., and Sintov, A. Pharm. Res. 9, 278-278 (1992)). Alginates have been cross linked with poly(ethylene glycol)-diamines in order to investigate the changes in elastic modulus that occur with increasing cross linking density and the mass of the cross linker (Eiselt, P., et al. (1999) Macromolecules, 32, 5561-5566).

Collagen cross linked with glutaraldehyde has been shown to produce films with increased mechanical strength when mixed with gelatin. The claimed increase in mechanical strength is thought to be due to the reagent's effect on the isoelctric point of the collagen (critically reducing it to below 6.2) as the same effect could be achieved by acetylation of the collagen with acetic anhydride (see GB 2 052 518 A).

Enzymatic cross linking of water gels can also be achieved in certain circumstances. Poly(ethylene glycol) (PEG) functionalised with a glutaminamide and a lysine containing polypeptide will cross link in the presence of transglutaminase (Sperinde, J. J., Griffith, L. G., Macromolecules 30, 5255-5264 (1997).

Synthetic water gels such as PVP can also be cross linked chemically, by irradiation or photoactivation.

Never before however, have these structures been suggested for use in pressure impulse mitigation.

Thus, viewed from one aspect the invention provides the use of a cross-linked water gel in pressure impulse mitigation, e.g. blast mitigation or mitigating the effects of a projectile.

Viewed from another aspect the invention provides a method for protecting an entity, e.g. a structure or organism, from the effects of an explosion or from the effects of contact with a projectile comprising covering at least a part, preferably at least 10% thereof, e.g. all of said entity in a barrier comprising a cross-linked water gel.

By pressure impulse mitigation is meant, inter alia, that at least one of the effects, preferably all of the effects of an explosive blast, e.g. fragmentation or collapse of buildings or glass, translation of objects within the building and primary and secondary effects of fire are reduced.

Pressure impulse mitigation also covers mitigating the effects of contact with a projectile, i.e. mitigating the potential damage caused by a projectile or in the mitigation of projectile induced damage. The projectile may be, for example, a bullet, missile, shrapnel, space debris etc.

By entity is meant anything which should be protected from the impact of an explosion or from damage by a projectile, e.g. structures, organisms and the general physical environment.

An organism is a living plant or animal, e.g. a human. By structure is meant any inanimate object which could be protected from explosive damage such as buildings (temporary or permanent), industrial plant, civil infrastructure, vehicles, military equipment, computers etc.

By cross-linked water gel is meant a cross-linked mixture of water and a gel which forms a solid elastomeric barrier. The gel should preferably be non-toxic and cheap to manufacture or isolate. It should exhibit elastomeric properties, have a high elastomeric modulus and a high ductility.

Suitable gels include gelatin, gellan gum gels, poly (gamma-benzyl-L-glutamate) (PBLG), agar (preferably composed of 70% agarose, a gelsaccharide and 30% agaropectin), collagen, protein gels, polysaccharide gels, keratin gels, hydrogels, ormosils (organically modified silicates often of formula $(R'_nSi(OR)_{4-n}$ in which R is typically an alkyl group and R' an organic group), sol-gels, hydrophilic polymer gels, and glycoprotein gels. Other suitable gels include bio-gels such as carrageenans, pectins, chitosan (e.g. deacylated chitin), alginates (e.g. xanthan alginates casein), seed gums, egg protein g and Gelacrimide gels. Mixtures of gels can be employed.

These gels can be obtained from commercial sources. A preferred gel is gelatin. The gelatin preferably has a molecular weight range of 20,000 to 300,000 D, e.g. 20,000 to 150,000 D and can be made from the hydrolysis of collagen.

Suitable agents to effect the cross-linking of the gels are multifunctional molecules, e.g. bi, tri or tetrafunctional molecules, capable of linking the polymer chains of the gel in question. The reactive functionalities on the cross-linking agent are conveniently the same and these can be separated by spacer groups. Such a spacer group may preferably comprise a chain of 1 to 20 atoms, e.g. an alkylene chain optional interrupted by heteroatoms such as O, N, P or S linking the reactive functional groups. The spacer group chain length actually selected will depend upon the water gel polymer to be cross linked and the mechanical and physical properties required of the cross linked gel. Suitable reactive cross-linking functional groups are well known and include aldehydes, esters (in particular N-hydroxy succinimide esters and imidoesters), amines, thiols, hydroxyls, acid halides, vinyls, epoxides and the like.

Thus, cross-linking agents may be of general formula (I)

$$X\text{-Sp-}X \qquad (I)$$

wherein each X independently represents the residue of an aldehyde (i.e. —COH), the residue of an ester (i.e. —COOR) in particular N-hydroxy succinimide esters and imidoesters (—CNOR), amine, thiol, hydroxyl, acid halide or vinyl and Sp is a spacer group comprising a chain of 1 to 100 atoms in its backbone, preferably 1 to 50, more preferably 1 to 20, e.g. 4 to 12 atoms, especially 5 to 10 atoms. X may also be epoxide. The group R can be any group which allows the formation of an ester which is preferably labile. R may therefore be a C1-20 alkyl, an optionally substituted N-hydroxy succinimide group and so on.

Alternatively, the cross-linking agent may be a multifunctional species of formula (II)

$$(X\text{-Sp})_nY$$

wherein X and Sp are as hereinbefore defined, Y is a carbon atom, C—H or a heteroatom such as a nitrogen or phosphorus atom and n is 3 to 5. Obviously, the value of n varies depending on the nature of the Y atom employed as will be readily understood by the person skilled in the art. Thus when Y is C then n is 4. If Y is C—H then n is 3.

Preferred groups X are electrophilic functional groups such as esters, carboxylic acids or aldehydes or nucleophilic groups such as amines and hydroxyls.

Whilst the X groups may be different, especially preferably, all X groups are the same. Especially preferably these are selected from aldehydes and esters, in particular imidoesters or N-hydroxy succinimidyl esters.

The spacer chain is preferably substantially linear and is formed primarily of carbon atoms which can be interrupted by heteroatoms such as oxygen, nitrogen and sulphur. By substantially linear is meant that the spacer arm is free from branched side chains of three atoms or above, i.e. the spacer may carry short chain branches like methyl or ethyl groups.

The spacer chain is preferably linear (i.e. free of branches) and is preferably formed from a carbon atom backbone, e.g. a $C_{1-40}$ carbon backbone, preferably $C_{1-20}$ alkylene chain (e.g. methylene or a $C_{7-9}$ alkylene chain).
The backbone may contain one or more aryl groups such as phenyl or benzyl in its length, (e.g. two aryl groups), preferably linked through the 1 and 4 positions of the ring. As mentioned above, the backbone may be interrupted by heteroatoms, e.g. oxygen or nitrogen, to form for example, an ether spacer group. Up to 10, preferably up to 5, e.g. up to 3, such as 1 heteroatom may be present. The backbone might also contain oxo groups along its length. Again whilst the Sp groups may all be different, it is preferred if these are the same.

When Y is a heteroatom it is obviously one which can have a valency of at least 3, e.g S, N, P.

Preferably, Y is a nitrogen atom or a phosphorous atom. The subscript n is preferably 3 when Y is nitrogen and 3, 4 or 5, especially 4, when Y is phosphorous.

Highly preferred cross-linking agents are biscarboxylic esters.

Specific cross-linking agents of particular utility in the invention include sebacic acid esters (e.g. the N-succinimidyl ester whose structure is depicted below), bis(sulphosuccinimidyl) suberate,), disuccinimidyl suberate, imidoesters such as dimethyl suberimidate, trissuccinimdyl aminotriacetate (TSAT, Pierce Biotechnology Inc.), beta-tris(hydroxylmethylphosphino) propionic acid (THPP, Pierce Biotechnology Inc.), bisphenol A diglycidyl ether, avidin-biotin. The known gelatin cross-linker gluteraldehyde is preferably not employed.

Scheme 1. Sebacic Acid bis (N-succinimidyl) ester (SANHSE)

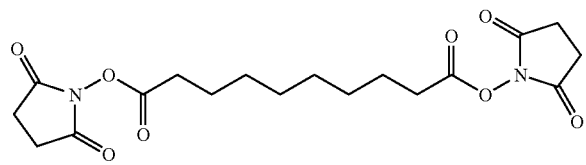

The SANHSE, in common with other bis-succinimidyl derivatives, is easily synthesised by condensing N-Hydroxysuccinimide with a dicarboxylic acid in the presence of dicyclohexylcarboiimide, the carboxylic acid being selected to provide a spacer of desired length. The resulting product contains two amine-reactive N-hydroxysuccinimide esters. This compound exhibits poor water solubility however. Hydrophilicity (and hence solubility) can therefore be increased by the addition of a sulfonate group into the succinimidyl ring. A number of water soluble bis-succinimidyl cross linkers are now commercially available from PIERCE (e.g. Bis(sulfosuccinimidyl) suberate (BS3).

Viewed from another aspect therefore, the invention provides a water gel mixture (preferably a water gelatin mixture) cross-linked by reaction with an imidoester or conventional ester, in particular a bis imidoester or bis ester, e.g. a sebacic acid ester especially a succinimidyl ester.

The water gels of the invention should preferably have a stiffness in the range of 20 to 100 kPa, preferably 30 to 60 kPa.

Another property of the water gel is its stress relaxation, with values in the range 0.05 to 0.3 kPa being preferred. Higher stress relaxation values indicate an increased ability to withstand impulse pressure.

The cross-linked mixture of water and gel can comprise at least 3% by weight of the gel, preferably at least 4% by weight gel, especially at least 5% by weight gel, up to the limit of solubility of the gel in water, e.g. between 10% by weight and 50% by weight of gel, or in the range 15% by weight to 40% by weight gel, e.g. 20 to 35% wt.

Mixing of the water and gel can be achieved by any convenient means, preferably with stirring or sonication to ensure complete mixing. Thus, the hot gel can be mixed with water in a mould and allowed to cool to form the water gel. The water used may be deionised or distilled if desired but this is not essential. Other sources of water such as tap water are also employable. The cross-linking of the water gel can be carried out using any suitable protocol, e.g. direct addition. Thus, the cross-linking agent could simply be added to an appropriate concentration of water gel mixture at a suitable pH to effect cross-linking. For example, cross-linking may be effected by the addition of an aqueous solution of a water soluble imidoester, such as dimethyl suberimidate.2HCl (DMS), to 20-35% w/v gelatin in aqueous solution, in PBS or other suitable buffer. An appropriate pH for the addition would be in the range 7.5 and 9.5 and temperatures of 20 to 40° C., e.g. 30-35° C. or 22-24° C. could be employed.

The concentration of cross-linker employed may be between 0.25 and 25 mM, e.g. 10 to 20 mM giving, in the case of gelatin, a molar ratio of amino groups to reagent of between 1:2 to 1:5.

Viewed from another aspect therefore the invention provides a process for the preparation of a cross-linked water gel comprising contacting a water gel mixture, preferably comprising 20 to 35 wt % gel, with an imidoester, preferably at a pH of 7.5 to 9.5 and at a temperature of 20 to 45° C., e.g. 25 to 40° C.

Of particular utility however, is a process in which either a weak water gel solution or alternatively a soluble elastomeric monomer or mixture thereof e.g. resilin or elastin (or synthetic analogues of such monomers) is preincubated with a cross-linking agent preferably under carefully controlled conditions of pH and temperature. Thereafter, the preincubated material is contacted with a higher concentration water gel mixture to complete the cross-linking process.

Thus, the cross-linking agent, e.g. sebacic acid bis(N-succinimidyl) ester (SANHSE), can be added to a low concentration water gel mixture, e.g. 0.5 to 5 wt % of gel, preferably 1 to 5 wt %, more preferably 1.8 to 2.0 wt % or 2 to 4 wt % or added to a soluble elastomeric monomer or mixture thereof. Such an elastomeric monomer may be present in an aqueous solution which may preferably be of low concentration, e.g. 15 wt % of monomer, i.e. the concentration of monomer is less than the concentration of water gel used in the second stage.

It may be convenient to dissolve the cross-linking agent in an aqueous or organic solvent such as water, methanol, acetone, DMSO or toluene to allow addition. The nature of the solvent employed depends on the polarity of the cross-linking agent as will be readily understood by the skilled chemist. It may also be useful to buffer the water gel mixtures so that pH values can be maintained throughout the cross-linking procedure. PBS buffer is suitable for this.

The temperature and pH of both stages of the cross-linking reaction are preferably controlled to obtain the desired cross-linking characteristics in each stage of the reaction. The temperature during the preincubation stage is preferably less than that of the second stage. Thus, in preincubation, temperatures are preferably kept around ambient, e.g. 15 to 25° C., preferably 20 to 24° C., especially 22 to 24° C. The pH of the preincubation stage can be greater than that of the second stage (e.g. up to 1 or 2 pH points greater) however it should preferably be the same as or less than that of the second stage. Suitable pH's range from 6.5 to 7.5, e.g. 6.8 to 7.4, e.g. approximately 7.

After a preincubation period (e.g. of between 0.25 to 4 hours, especially 20 to 45 minutes), the preincubated material can be added to a water gel mixture of higher concentration, e.g. 20 to 50 wt % gel, preferably 20 to 40 wt % gel, especially to 35% wt. The gel used may be the same as that employed in the first stage. What is important however, is that the gel employed in the second stage possesses a reactive group which is capable of completing the cross-linking reaction.

Thus, for example, where an N-hydroxysuccinimide ester is employed as the cross-linking agent, the second gel may preferably carry a reactive lysine functional group to complete the cross-linking reaction. It is preferred, however, if the gels employed in both stages are the same, e.g. both gelatin.

Preferred temperature ranges for this step are 38 to 48° C. and preferred pH's are 7.0 to 9, e.g. 7.5 to 8.7, preferably 8.0 to 8.5. For a SANHSE concentration of 0.5 mM to 5.0 mM, at pH 6.75-7.25 and at a temperature of 18 to 22° C., preincubation time is preferably 20 to 45 minutes.

The cross-linked water gel that forms can then be allowed to set for a suitable period at lower temperature, e.g. ambient temperature.

This novel process forms a further aspect of the invention. The invention therefore provides a process for the manufacture of a cross-linked water gel comprising:

contacting a lower concentration water gel or a soluble elastomeric monomer with a cross-linking agent at a first pH and a first temperature to form a preincubated sample;

adding said preincubated sample to a higher concentration water gel at a second temperature and a second pH, said second temperature being higher than the first temperature. Preferably said second pH is the same as or higher than said first pH.

The amount of cross-linking agent required can vary over a wide range although the molar ratio of amino groups in the gelatin to reagent should be 1:10 to 10:1 e.g. approximately 1:1. A 5 mM solution of SANHSE in 50 ml gelatin equates to 1:1. Maximum concentration of cross-linking agent may vary depending on its solubility. Highly preferred concentrations of cross-linking agents such as SANHSE are in the range 1.25 mM to 2.5 mM. It has surprisingly been found that increasing concentrations higher than this range does not necessarily impact favourably on final gel strength and may in fact reduce gel strength.

Whilst the preincubation process gives excellent results with reagents that are soluble in aqueous solution, it will be appreciated that many cross linking agents, including for example N-hydroxysuccinimide esters such as SANHSE, have a very low solubility in aqueous solution, a problem that is exacerbated in the presence of high concentrations of a hydrogel in the aqueous phase e.g. 30% w/w gelatin. This presents a very significant hurdle to using such reagents to crosslink the hydrogel due to rapid precipitation of the reagent. This in turn leads to great difficulty in achieving an even distribution of active reagent through the solution.

The use of a preincubation stage that has the effect of binding the crosslinking reagent to the hydrogel itself, e.g. gelatin molecules (preferably at a low initial concentration e.g. 1.8-2.0% w/w) or to a soluble elastomeric monomer allows the previously insoluble reagent to be carried into the second stage in a fully soluble but still active form. The use of the preincubation phase to overcome the inherently low solubility of many crosslinking agents, such as SANHSE, in the aqueous phase represents a still yet further aspect of the invention. Suitable elastomeric monomers include resilin and elastin or synthetic analogues thereof.

Another cross-linking method involves avidin and biotin. Avidin and biotin form the strongest naturally occurring non-covalent bond. It is entirely specific and with a kD of 10-15 (Green, A. J., (1966) Biochem J. 100:774-780). Cross-linking a water gel using these species is therefore attractive. Two forms of pre-reacted gelatin would be required: form (A)—modified with avidin and form (B) modified with biotin. When a reconstituted gel was required the A and B forms of the pre-reacted gelatin would be prepared as usual in aqueous solution. Once the A and B forms have been completely solubilised they are then mixed in equal proportions and the gel allowed to set. The A and B forms of the gelatin will automatically associate with each other through the interaction of the avidin and biotin. This avidin biotin driven aggregation of the gelatin monomers will result in the creation of a strong semi-covalent bonding network through the gelatin as it sets.

Biotinylation of gels is effectively and simply carried out using N-hydroxy succinimide esters of biotin, which is the same functional group as found in SANHSE. The form of NHS ester used could either be Biotin N-Hydroxysuccinimide or Biotinamidohexanoic acid N-Hydroxysuccinimide Ester. The latter having an amino caproate spacer arm which holds the biotin at a greater distance from the protein to which it is bound. It might also be possible to biotinylate the gelatin using a combination of these reagents to maximise the potential semi-covalent network formed within the gel state.

As with SANHSE the Biotin NHS esters readily react with the $\epsilon$-amino groups of lysine and the N-terminal $\alpha$-amino group (where this is not blocked) at pH 8.0-9.0.

Avidin is a glycoprotein extracted from eggs that can readily be attached to proteins.

It is envisaged that the mixing of the two gelatin components here could take place in the field allowing easy transport of water gel in powder form. Once the A and B form of the gelatin have been prepared they can be lyophilised and the powder stored prior to re-hydration and use.

The cross-linked water gels of the invention are inherently non-flammable, cheap and non-toxic making them very attractive building materials.

The cross-linked water gel mixture can be formed into sheets to provide barriers which mitigate the effects of explosion or the effects of contact with a projectile. There is a close relationship between the concentration of gel within a barrier, the thickness of the barrier and its performance, e.g. as a pressure impulse mitigant. The skilled person will be able to tailor concentrations and thicknesses to prepare sheets having desired properties.

The thickness of a protective barrier or sheet may vary depending on the nature of the barrier, e.g. whether it is being used to protect windows, personnel, buildings etc. However, suitable thicknesses are in the range 0.1 cm to 1 m, e.g. 1 to 50 cm such as 1 cm to 20 cm, preferably 2 cm to 10 cm.

Suitable thicknesses for barriers to be used in building cladding are in the range of 10 to 100 mm preferably 10 to 20 mm. Where the material is used to cover windows suitable thickness is in the range of 10 to 50 mm. When the material is used in clothing suitable thickness is in the range of 10 to 70 mm.

When used to protect against high velocity bullets, thicknesses may be of the order of 5 to 30 cm.

Viewed from a still further aspect therefore, the invention provides a barrier suitable for pressure impulse mitigation, e.g. a barrier for a window or armour, comprising a cross-linked water gel, the concentration of gel in the water being at least 3% w/w, said barrier having a thickness of at least 5 mm.

In order to protect the barrier material against degradation by, for example, bacteria or light it may be essential to mix the water gels with antibacterials (e.g. sodium azide) or proteinase inhibitors such as EDTA (e.g. at 5 mM concentration), detergents and/or antioxidants as additives in the water gel formulations. Other additives include colouring agents to produce a tinted product, emulsifiers, viscosity modifiers, organic additives (such as xanthum gum, starch), inorganic additives (such as sodium sulphate, calcium salts, magnesium sulphate, ammonium sulphate) can be employed.

Thus, the cross-linked water gel layer in the barrier of the invention should preferably comprise at least 50% by weight of cross-linked water gel component, more preferably at least 80% by weight, especially at least 95% by weight of water gel, e.g. 98% wt. Ideally, the cross-linked water gel layer should consist essentially of cross-linker, water and gel (i.e. incorporates only minor quantities of impurities or standard additives).

In general, the cross-linked water gel barrier of the invention is an insulator although it can comprise conductive materials if required. In the aftermath of an explosion, the fact that the material is an insulator may prevent electrical fires starting and may prevent electrocution of individuals.

The protective barrier of the invention may also comprise multiple layers. Layers of cross-linked water gel can therefore be mixed with other layers of optionally cross-linked water gel with differing concentrations of gel and/or with other pressure mitigating materials to form composites. In one embodiment therefore, the method of the invention may involve a barrier comprising a number of layers of cross-linked water gel. Moreover, in such a design, the outside cross-linked water gel layer may have the highest concentration of gel with decreasing lower concentrations of gel on the inside of the barrier.

In a preferred embodiment, the cross-linked water gel layer or layers are combined with at least one non water gel layer, for example, a polymer layer (e.g. a polyethylene (LDPE, LLDPE, HDPE), polypropylene or polycarbonate layer), a metal layer (aluminium or steel), a fabric layer (cotton), a ceramic layer, a fibreglass layer, a dilatant layer (polyethylene glycol layer or a silicone layer) or mixtures of such layers. A glass layer can also be used.

A dilatant is a material which thickens upon applied shear stress, e.g. may turn solid upon applied shear stress and examples thereof are polyethylene glycols and silicones.

This forms a further aspect of the invention and viewed from a further aspect the invention provides a barrier, e.g. to protect against the effects of an explosion or from the effects of contact with a projectile comprising a cross-linked water gel layer and a polymer layer, a metal layer, a fabric layer, a ceramic layer, a fibreglass layer, a glass layer, a dilatant layer or mixtures of such layers.

The composite structure could of course contain a number of cross-linked water gel layers and/or a number of other layers depending on the properties desired. Where fabric layers are used, it may be necessary to use a number of such layers in view of their narrow thickness. Thus, a multilayer barrier of use in the invention may comprise 2 to 20 layers, e.g. 3 to 10 layers.

Where a multilayer structure is employed it is preferred if the layers are in contact with each other, i.e. there are no gaps between the layers.

The thickness of additional layers can of course vary depending on the nature of the material involved. Suitable thicknesses range from 0.1 to 20 cm.

It has been surprisingly found that the pressure mitigation properties of the water gels of the invention can be especially enhanced by the addition of a layer of polyethylene glycol, e.g. an at least 0.5 wt % solution thereof, preferably at least 1% wt solution thereof. This layer should preferably be positioned outside the cross-linked water gel layer, i.e. will be contacted by the pressure wave/projectile first. The layer may be 0.1 to 1 cm in thickness.

This forms a further aspect of the invention and viewed from a further aspect the invention provides a barrier, e.g. to protect against the effects of an explosion or damage by a projectile, comprising a cross-linked water gel layer and a polyethylene glycol layer.

A further preferred combination is a polyethylene layer and cross-linked water gel layer, in particular where the polyethylene layer is wetted by the cross-linked water gel, i.e. these layers are in physical contact. Suitable polyethylenes are ethylene homopolymers or copolymers with propene.

Layers of fire retardant material, layers of material impervious to chemicals, radioactivity or biological agents could also be added to the barriers of the invention.

All layers of the protective barrier can be encapsulated in a suitable container if required, e.g. a polymer container such as a polypropylene container, for ease of transport and storage, although this is not essential.

In fact a further advantage of the invention is that the material itself can be transported in non-aqueous form, e.g. powder form, and made up to the water gel when required, e.g. using an avidin biotin cross-linker as described above. A potential difficulty with the water gels may be their weight but the fact that the material can be transported as a powder and made into the water gel only when required is a major advantage.

The cross-linked water gels could have important applications in the military and for the general public close to industrial sites such as chemical storage facilities, nuclear reactors or research laboratories or areas where transportation of hazardous materials occurs. Such compositions could be used in clothing to protect against, fire, explosion, projectile damage and the threat of chemical, biological or radiological contamination. The material may also act as a suppressant to chemical contamination by interacting with any aqueous soluble chemical to reduce the toxicity of the chemical.

The material of the invention may also provide therefore a barrier to chemical or biological contamination, e.g. as the result of a criminal attack or chemical leak. The surface of the water gel material is inherently sticky and hence biological and chemical compounds may attach to the surface of the material thereby preventing further contamination taking place. Water soluble agents may dissolve in the water gel barrier. Organic agents are insoluble in the water gel and will therefore be repelled.

Additionally the water gel material acts as a barrier that, unlike most open weave material, prevents biological materials under the size of 5 microns from passing through to the surface of a material below.

The water gels may also have applications in environments where sterility is required, e.g. in hospitals or laboratories.

The water gel could aid in preventing infection e.g. when used as a coating agent in a treatment room which can easily be removed and replaced when necessary.

The water gel material may also act as a barrier to alpha and beta particles of radiation that may be present in sources used in industry and in weapons used by the defence forces. Research from Japan has shown that the effects of thermal radiation are reduced by up to 50% by clothing acting as a barrier to radiation. If beta particle emitters come into contact with the skin a beta burn may result and the water gels of the invention may prevent this occurring.

The effects of radiation were observed in Japan and in the Marshall Islanders in 1954 (Source of case studies in Japan and Marshall Islands, Glasstone and Dolan, The effects of nuclear weapons, US Dept. of Defence pubd 1977 ed). Alpha emitters and beta particles can deposit their entire energy within a small sensitive volume of the body tissue causing damage. Particles of greater than 10 micrometers are filtered out by the nose and 95% of 5-10 micron particles are also filtered but the very fine particles under this size reach the lungs causing internal body damage. Alpha particles can be retained in the lungs for a long time and can cause serious injury to lung, liver and bone. In the Marshal islands studies much of the material contaminated food, water, utensils and other objects in the environment.

Because radiological sources are present in hospitals and industrial locations and are also sought for criminal use, widespread contamination of the environment as well as body effects on people and other organisms is possible.

Currently available biological/radiological masks that have been produced for protection against viruses and organisms such as anthrax are constructed to transmit only particles of under 5 microns when the person is breathing. Special filters are also used for heavy contamination situations, e.g. charcoal which absorb or physically hold the hazard so that it does not reach the person's airway. The water gels of the invention may act as a further physical barrier for use in masks.

Moreover, if a water gel layer was combined with, for example, a boron layer a broader range of radiological effects could be preventable. Thus, gamma radiation or neutrons could be absorbed by a water gel barrier comprising a boron layer.

Water gel barriers also provide the added advantage that post contamination clean up is made much simpler. Since the chemical or biological agent may stick to or dissolve within the water gel, clean up can be effected simply by removing the water gel sheet from the structure in question. This forms a further aspect of the invention and hence viewed from a further aspect the invention provides the use of a cross-linked water gel to protect entities, e.g. structures or organisms against chemical, biological or radiological contamination.

The material may also be used to mitigate contamination after an incident by being applied as a decontamination material, e.g. by unrolling sheets of the material down roads or surfaces.

In some applications there may be several layers to provide various protections from heat and blast with an optional top layer being a throw away contaminatable layer.

The water gel can be formed into any suitable shape or form depending on the nature of the protective barrier desired. The water gels of the invention can be formulated into sheets using known techniques such as injection moulding or thermal cooling of the material. The width of the material will depend on the nature of the use. Thus, where the water gel is being used to prevent fragmentation of glass in a window, the water gel can be formed into a sheet for use in covering the window or for placing within double glazing. The water gels of the invention may also be used as protective barriers, e.g. sheets on or within buildings or on equipment. Thus, water gel sheets could be used as building cladding, blast curtains or formed into thin sheets for covering equipment such as computers.

When used as a protective layer over building cladding, it is most important that the lower part of the building is protected from the effects of a blast. Thus, the protective water gel barrier may be adhered only to the lower part of a building, e.g. the bottom three floors since this is the area which suffers from the greatest blast impact from a ground based explosion. The protective water gel barrier may be continued inside the building on partitions or inside walls to strengthen the structural resistance to blast. The material may also be used as a protective surface across the whole façade of a building to protect against explosive pressures from very large explosions or from air-borne contaminants from an explosion.

Water gels may also be formulated as protective blankets, or clothing for personnel. Thus, the barrier could be in a form to protect the eyes, ears or feet, e.g. as shoes. Alternatively, very large sheets of water gel could be produced for covering critical environmental areas, e.g. reservoirs, or iconic targets. Temporary structures, in particular temporary military structures, may be covered with this material to mitigate the impact of explosions on buildings equipment and personnel.

For convenience, the material for permanent or temporary fixing across doors, windows, on horizontal or vertical surfaces etc may be in rolls that can be cut to create barriers. The material may also be extrudable.

The forming of the water gels into desired shapes can be achieved easily using known equipment, e.g. those used in the food industry to make jelly or those used in the pharmaceutical industry to make capsules.

The water gels of the invention can also act to disrupt the flight of projectiles, i.e. can act as armour by protecting against bullets etc.

It is envisaged that the water gels of the invention may mitigate pressure through the shock absorbing characteristics of the gel. Moreover, the gel fibres are envisaged to change the trajectory of a projectile and create drag on the projectile.

The gel may therefore resist the pressure wave of a projectile by absorption thereof. The gel is able to compress expand during shockwave impact and "bounce back" the pressure wave onto the oncoming projectile or shock wave. This action reduces or eliminates the pressure wave created by the projectile and reduces or eliminates the kinetic shock of the projectile.

The gel also reduces the inherent energy of the projectile through slowing the speed of passage of the projectile through the gel and this reduces the projectile pressure wave on the entity being protected by the gel. The gel also focuses the pressure wave of the projectile back along the trajectory of the projectile thereby creating a pressure effect outside the gel layers and shield material.

Projectiles may be in the form of bullets, rockets or missiles or other projectiles travelling at speeds that may be in excess of 3,500 meters/second.

Thus, the gels of the invention have a range of applications from bullet proof vests and helmets to replacement for sandbags to protect army personnel from enemy fire.

The water gels of the invention may also have utility in the protection of ships from blast or projectiles. Both commercial and military ships have been the recent targets of terrorists and military ships in particular face dangers with mines and missiles. The water gels of the invention may be used to coat either the inside and/or outside of the ship's hull to thereby act as a pressure mitigant. Where a ship has a double hull, the water gel may be used to coat both hulls or used in the cavity between hulls.

The water gel layer employed may be as thin as 2.5 cm and may be applied to the hull using a conventional adhesive. Thicker layers can be applied to parts of the ship where extra protection may be required, e.g. to protect parts of the hull where damage could cause the hull to split or to protect parts of the hull housing weaponry etc.

It is also envisaged that ships could be fitted with permanent or preferably temporary skirts to prevent any damage occurring to the hull at all. The skirts would take the form of vertically suspended panels of water gel made as thin as possible to minimise weight. Such skirts may be suspended from the side of the ship, e.g. using wires, and may prevent attacks on a ship's hull from surface to surface missiles, torpedoes, mines, or terrorists in boats. In view of their weight, these skirts could be employed only on areas of the hull where explosive damage could be critical, e.g. at the centre point of the hull where explosive damage may cause the hull to split.

Also, the skirts could be employed temporarily as a ship passes through potentially dangerous waters, the skirts being removed once the ship returns to safer areas. Thus, skirts could be employed when a ship was in port, near the coastline or in a narrow channel etc but removed in open waters. The skirts create a buffer between the hull and the skirt to mitigate any explosive effects on the hull. Moreover, in view of their make up, the skirts are not visible from afar and are difficult to detect by radar.

The gels could also be used to protect other marine installations such as oil rigs, underwater cables, pipelines, underwater monitoring equipment and could even be used to protect submarine hulls.

The material may also have applications deep underground where tunnels could be lined with the water gels to mitigate the effects of explosions underground. Drilling equipment etc could also be protected.

The water gels can also be moulded to form a protective shell on a vehicle. Military vehicles which carry personnel or equipment are conventionally covered with very thick and hence heavy metal plates to stop incoming small arms fire, rocket propelled grenade rounds, damage from mines and shells. When the water gels of the invention are moulded, e.g. with a fibreglass or polyurethane shell it may be possible to manufacture a light, fast vehicle capable of withstanding damage from these threats. 30 cm of water gel material covering a lightweight body could stop incoming attacks.

The vehicle chassis could be shaped to minimise the chance of the vehicle being detected by radar. Thus, the external appearance of the vehicle may be similar to the inverted hull of a boat or akin to the shape of an armadillo. The water gels of the invention are inherently hard to see with radar and the combination of the water gel and the special vehicle shape may make the vehicles very difficult to detect.

The material could also be used as a fuselage or wing liner in aircraft. In particular, the hold of an aircraft could be lined with the material to mitigate the effects of an explosion within the hold. Furthermore, cargo containers themselves could be lined with the material, internally or externally.

A still further potential application of the water gels is in space where they could be used to cover space vehicles to protect them from space debris. If a satellite, rocket, space station etc comes into contact with an article of space debris, considerable damage can be done in view of the incredibly high speed of impact. A recent space shuttle accident was caused by damage caused by small parts detaching from the upper portions of the rocket and contacting the lower portion of the shuttle vehicle. Such damage could be minimised if the water gels of the invention where employed as coatings.

It is also envisaged that the water gels of the invention may protect against heat, flame and fire. By definition, the water gels of the invention comprise an aqueous component. For this reason, they are capable of absorbing heat and dousing flame much more efficiently than other pressure impulse mitigation materials. It is a particular advantage of the invention that the water gel pressure impulse mitigation material simultaneously can act to protect against fire.

When exposed to heat, it is envisaged that the water gel may partially or completely melt thereby releasing water to help quench any fire. Moreover, during an explosion, the water gel may first absorb the effects of the explosive blast and heat associated therewith and subsequently melt to prevent associated fire damage.

The water gel barriers of the invention may also serve to protect organisms against flame burns from secondary contact with hot objects. A skin temperature of 70° C. will produce the same type of burn as exposure to 48° C. for a few minutes. Skin burns under clothing depend on the colour, thickness and nature of the fabric and if the fabric ignites. Research has suggested that burns were more severe where an individual wore dark clothing than white clothing because of the reflection of heat by white and light fabrics. In this embodiment the water gel could be combined with a thermal insulating layer to prevent heat transfer to the skin.

The water gel barriers of the invention may also help in the event of a conventional fire, particularly in a building in which the external structure is predominantly made from glass. During a fire in such a building, the metal frame of the building tends to expand and the windows can therefore fall out of their frames. The presence of a water gel will slow down any expansion of the building frame thereby allowing fire-fighters more time in which to control the fire.

The water gel would also act as a heat reducer in wooden buildings.

The water gels of the invention are more effective at mitigating the effects of fire at lower gel concentrations, i.e. higher water concentrations. However, the water gels are more effective at pressure impulse mitigation at higher gel concentrations. It is therefore within the scope of the invention to provide a multilayer barrier comprising water gel layers having varying gel concentrations to provide barriers tailored to mitigate the effects of both fire and pressure.

It is a particular advantage of the material of the invention that it is transparent and hence does not affect the amount of light entering a building when used as a window protector or affect the external appearance of a building when used as a cladding. Fixing the material to a structure can be achieved using conventional techniques. For example, for window protection, the material may be adhered to the window surface (inside and/or outside) using known adhesives such as ceramic bonds or other bonding materials that adhere to wood, concrete or glass surfaces. These materials are readily available through suppliers to dentists for bonding of ceramic veneers to teeth, and in the construction industry for bonding materials together.

It is particularly advantageous if the bond between the water gel sheets and the window is stronger than the fixing holding the window frame into the wall.

Within clothing or where sheets are being bonded together to create large surface areas for protection the use of these industrial bonding agents may create seams that should be stronger than the water gel material and protect large surface areas from the pressure of being split at the seams.

The material could be placed in wall cavities or roof space or secured to the outside of a building by adhesives or in a frame. The person skilled in the art can devise alternative methods of fixation.

Other forms of encapsulation of layers of the water gel material may involve vacuum sealing and the use of hydrostatic films as is known in the art. The gels may be acidic or basic giving rise to further options for fixation.

Thus, the water gels of the invention can simultaneously act against the possible detrimental effects of explosions, projectiles, fire, chemical, radiological or biological leakage.

The invention will now be further described with reference to the following non-limiting examples and FIGS. 1 and 2.

BRIEF DESCRIPTION OF THE FIGURES

FIG. 1 shows the energy dissipation on 0.22 bullets for certain cross-linked water gels of the invention.

FIG. 2 compares energy loss with stiffness for said cross-linked water gel.

DETAILED DESCRIPTION OF THE INVENTION

Example 1

Preincubation

2% w/v gelatin was prepared in Peptone Buffer Saline (PBS) and allowed to cool slowly to room temperature. The pH of this 2% solution was then adjusted as required to either pH 7.0 or pH 8.0. This 2% solution was maintained at temperatures between 22-24° C.

The 2% solution was then divided into 50 ml aliquots in 75 ml Pyrex vessels.

Sebacic acid bis N-succinimidyl ester (SANHSE) was prepared immediately prior to use. The reactions described were carried out at a reagent concentration of 5 mM. The SANHSE samples were solubilised/emulsified in 1 ml or 5 ml of either 95% methanol or toluene.

The gelatin solution was placed on a magnetic stirrer and spun into a vortex. The reagent was added and the solution allowed to spin for a further 30 seconds to allow complete dispersal. The samples were maintained at 22-24° C. for 4 hours. Every 15-20 minutes the tubes were gently agitated by rotating them 3-4 times to disperse any SANHSE that was not fully solubilised.

Second Stage

At the end of the pre-incubation period the reacted 2% gelatin was mixed with 150 ml aliquots of concentrated gelatin solution (20% w/v) that had been adjusted to pH 8.0 and was maintained at 38-48° C. The mixing was carried out using a domestic electric food mixer for 30 s to ensure complete miscibility of the two gelatin solutions. Immediately after the mixing was complete the mixed sample was placed in standard plastic 280 ml food containers and allowed to set at room temperature (18-20° C.) for 16 hours. A visible sol-gel transition occurred within 30 minutes. Thereafter the cross linked gelatin samples were stored at 4° C.

Table 1 sets out the 2% w/v gelatin samples produced and the solvent used to dissolve or emulsify the SANHSE.

TABLE 1

| Gelatin pH | Cross-linking agent/Solvent |
| --- | --- |
| pH 8.0 | No Reagent |
| pH 8.0 | 5 mM SANHSE |

TABLE 1-continued

| Gelatin pH | Cross-linking agent/Solvent |
| --- | --- |
| pH 7.0 | 200 mg in 1 ml of Methanol |
|  | 5 mM SANHSE |
| 45 ml at | 200 mg in 1 ml of Methanol |
| pH 8.0 | 5 mM SANHSE |
| pH 8.0 | 200 mg in 5 ml of Methanol (i.e. 10% solvent) |
|  | 5 mM SANHSE |
|  | 200 mg in 1 ml of Toluene (i.e. approximately 2% v/v in reaction solution) |

Example 2

The cross linked gel samples in the 280 ml plastic food containers were tested for their ballistics capacity using a 0.22 rifle. The entry and exit speeds of the bullet were measured by light gates at entry and on exit. As the mass of the bullet is known the energy dissipated per cm of the approximately 15 cm flight path through the gel can be estimated. The results for energy dissipation in $Jcm^{-1}$ are set out in FIG. 1 and a comparison of % energy loss and stiffness in KPa are set out FIG. 2.

% Energy Loss Results

The control sample indicates that average energy loss for the non cross-linked gel is around 0.6 J/cm. The average energy losses fell into three distinct categories with the strongest samples being some 4 times stronger than the control:

A) The control at approximately 0.6 J/cm;

B) The pH 8.0 pre-incubation at both 1% and 5% v/v methanol solvent concentrations, both at approximately 1.1 J/cm; and C) The pH 8.0 pre-incubation at 2% v/v toluene and the pH 7 pre-incubation, both at approximately 2.2-2.4 J/cm.

The lowest average energy lost per cm was unsurprisingly the non-cross linked control sample. A significant rise in stiffness (approximately 33% over the control sample) was observed with the 2% v/v toluene reaction. Of equal significance was the result that the sample pre-incubated at pH 7.0 and then mixed with the 20% gelatin solution at pH 8.0 gave the best energy dissipation per cm. This would seem to accord with the hypothesis that at pH 7.0 individual gelatin monomers have reacted with the SANHSE but some will still have a free and reactive terminal NHS ester, due to the low total protein concentration and the unfavourable pH both in terms of amino group reactivity and any competing hydrolysis. On addition to the 20% gelatin at pH 8.0 the un-reacted terminal NHS ester groups will rapidly react with the abundant de-protonated amino groups that will now be present, thereby creating an extensive covalently bonded network through the gelatin as it sets.

By way of comparison the 2% gelatin solution pre-incubated with SANHSE at pH 8.0 and then mixed with the 20% gelatin at pH 8.0 had energy absorbing capability being approximately 1.2 J/cm, whereas the energy absorbing capacity for the pH 7.0 pre-incubation sample was double this at 2.2 J/cm, which in turn is some four times that of the control gel. This would suggest that a second phase of cross linking has occurred.

Example 3

Preincubation

A 1.85 to 2.0% w/v gelatin solution was prepared directly in Peptone Buffer Saline (PBS) and allowed to cool slowly to room temperature. The pH of this solution was then adjusted as required to pH 6.75-7.25. The solution was maintained at temperatures between 20-25° C.

The solution was then divided into 100 ml aliquots in Pyrex vessels.

Sebacic acid bis N-succinimidyl ester (SANHSE) was prepared immediately prior to use. The reactions described were carried out at a final theoretical reagent concentration of 5 mM, which equates to 200 mg of SANHSE per ml of solvent. The SANHSE samples were solubilised/emulsified in 1 ml of either 95% methanol, 100% methanol or toluene.

The gelatin solution was placed on a magnetic stirrer and spun into a vortex. The reagent was added and the solution allowed to spin for a further 30 seconds to allow complete dispersal. The preincubated samples were maintained at 22-24° C. for up to 4 hours. Every 15-20 minutes the vessels were gently agitated by rotating them 3-4 times to disperse any SANHSE that was not fully solubilised.

Second Stage

At the end of the pre-incubation period the reacted gelatin was mixed with 400 ml aliquots of concentrated gelatin solution (20-35% w/v) that had been adjusted to pH 8.15-8.65 and was maintained at 38-48° C. The mixing was carried out using a domestic electric food mixer for 30 s to ensure complete miscibility of the two gelatin solutions. Immediately after the mixing was complete the mixed sample was placed in various moulds including a plastic 280 ml food container and allowed to set at room temperature (18-20° C.) for 16 hours. A visible sol-gel transition occurred within 30 minutes. Thereafter the cross linked gelatin samples were stored at 4° C.

Example 4

Production of a 28% w/w Cross Linked Water Gel

A solution of 35% w/w of gelatin in aqueous solution is prepared and adjusted to a final pH of 7.1-7.3 by the addition of 10% sodium hydroxide solution. The solution is maintained at a temperature of 40-45° C. If the resulting gel is to be kept for any length of time methyl paraben (0.2%) and propyl paraben (0.15%) should be included in the final mix as antimicrobial agents. This constitutes Solution A.

The pre-polymer solution is prepared by diluting down a volume of Solution A to produce a final concentration of gelatin of 1.8%, the pH is adjusted to 6.7-6.9, and the solution is allowed to cool to 20-25° C. The SANHSE is emulsified in methanol at a concentration equivalent to a 10% solution. The reagent is then added to the 1.8% gelatin solution and stirred continuously but slowly for 30-35 minutes. The temperature is maintained at 20-25° C. throughout. This constitutes Solution B.

Once the preincubation of Solution B has been completed it is added to Solution A at a ratio of 1:4, whilst being vigorously stirred with a spiral mixer. The mixture is then allowed to stand for 30 minutes at a temperature of 40-42° C. in a sealed container (under laboratory conditions the container can be ideally stood in a preset drying oven).

The final cross linked water gel solution is then adjusted to a final pH of 6.0 by the addition of approximately 3 ml of 10M HCl and then poured into the desired mould and allowed to set.

The invention claimed is:

1. A method for protecting an entity from the effects of an explosion or from the effects of contact with a projectile comprising covering at least a part of said entity in a barrier comprising a cross-linked water gel, wherein said water gel comprises gelatin and water.

2. A method for protecting an entity from the effects of an explosion or from the effects of contact with a projectile comprising covering at least a part of said entity in a barrier comprising a cross-linked water gel, wherein said cross-linked water gel is cross-linked by a cross-linking agent selected from the group consisting of:

(a) general formula (I)

$$X\text{-Sp-}X \qquad (I)$$

wherein each X independently represents the residue of: an aldehyde (—COH), an ester (—COOR), an epoxide, an amine, a thiol, a hydroxyl, an acid halide or a vinyl and Sp is a spacer group comprising a chain of 1 to 100 atoms in its backbone; and (b) general formula (II)

$$(X\text{-Sp})_n Y \qquad (II)$$

wherein X is the residue of: an aldehyde (—COH), an ester (—COOR), an epoxide, an amine, a thiol, a hydroxyl, an acid halide or a vinyl and Sp is a spacer group comprising a chain of 1 to 100 atoms in its backbone, Y is a carbon atom, C—H or a heteroatom and n is 3 to 5.

3. The method as claimed in claim 2 wherein all groups X of general formula I are the same and represent the residue of an ester.

4. The method as claimed in claim 2 wherein Sp is a $C_{1-50}$ alkylene chain.

5. The method as claimed in claim 2 wherein Y of general formula II is nitrogen and n is 3, or Y is phosphorus and n is 4.

6. The method as claimed in claim 2 wherein said cross linking agent comprises an N-hydroxysuccinmide ester.

7. The method as claimed in claim 2 wherein the cross-linking agent is an imidoester.

8. The method as claimed in claim 2 wherein the cross-linking agent is avidin-biotin.

9. The method as claimed in claim 1 or 2 to protect an entity from the effects of an explosion.

10. The method as claimed in claim 1 or 2 to mitigate the effects of contact with a projectile.

11. A process for the manufacture of a cross-linked water gel comprising:
  contacting a soluble elastomeric monomer or mixture of monomers with a cross-linking agent at a first pH and a first temperature to form a preincubated sample;
  adding said preincubated sample to a water gel at a second temperature and a second pH, said second temperature being higher than the first temperature.

12. The process as claimed in claim 11, wherein said water gel comprises water and a gel selected from gelatin, gellan gum gels, poly(gamma-benzyl-L-glutamate), agar, collagen, protein gels, polysaccharide gels, keratin gels, hydrogels, ormosils, sol-gels, hydrophilic polymer gels, glycoprotein gels, carrageenans, pectins, chitosan, alginates, seed gums, egg protein g and Gelacrimide gels or mixtures thereof.

13. The process as claimed in claim 12 wherein said water gel comprises gelatin and water.

14. The process as claimed in claim 11 wherein said water gel comprises gelatin and water and said elastomeric monomer is elastin.

15. The process as claimed in claim 11 wherein said cross-linking agent is of general formula (I)

$$X\text{-Sp-}X \qquad (I)$$

wherein each X independently represents the residue of: an aldehyde (—COH), an ester (—COOR/CONR), an amine, a thiol, a hydroxyl, an acid halide, epoxide or a vinyl and Sp is a spacer group comprising a chain of 1 to 100 atoms in its backbone.

16. The process as claimed in claim 11 wherein said cross-linking agent is of general formula (II)

$$(X-Sp)_n Y \qquad (II)$$

wherein X is the residue of: an aldehyde (—COH), an ester (—COOR/CONR), an amine, a thiol, a hydroxyl, an acid halide, epoxide or a vinyl and Sp is a spacer group comprising a chain of 1 to 100 atoms in its backbone, Y is a carbon atom, C—H or a heteroatom and n is 3 to 5.

17. The process as claimed in claim 15 wherein all groups X are the same and represent the residue of an ester.

18. The process as claimed in claim 15 wherein and said group Sp is a $C_{1-50}$ alkylene chain.

19. The process as claimed claim 16 wherein Y is nitrogen and n is 3, or Y is phosphorus and n is 4.

20. The process as claimed in claim 11, wherein said cross linking agent comprises an N-hydroxysuccinmide ester.

21. The process as claimed in claim 11, wherein the cross-linking agent is an imidoester.

22. The process as claimed in claim 11, wherein the temperature of the first stage is 15 to 25° C.

23. The process as claimed in claim 11, wherein the pH of the first stage is in the range 6.5 to 7.5.

24. The process as claimed claim 11, wherein the temperature of the second stage is 38 to 48° C.

25. The process as claimed in claim 11, wherein the pH of the second stage is in the range pH 7.0 to pH 9.

26. The process as claimed in claim 11, wherein the first stage lasts 20 to 45 minutes.

27. A barrier suitable for pressure impulse mitigation comprising a cross-linked water gel, the final concentration of gel in the water being at least 3 wt %, said barrier having a thickness of at least 5 mm.

28. The barrier as claimed in claim 27 comprising a cross-linked water gel layer and a polymer layer, a metal layer, a ceramic layer, a fabric layer, a fiberglass layer, a glass layer, a dilatant layer or mixtures of such layers.

29. The barrier as claimed in claim 27 wherein the gel is gelatin.

30. The barrier as claimed in claim 27 comprising a dilatant layer containing a polyethylene glycol layer.

31. The barrier as claimed in claim 27 comprising a layer of fire retardant material, a layer of material impervious to chemicals, radioactivity or biological agents.

32. A ship or vehicle comprising a barrier as claimed in claim 27.

33. The method as claimed in claim 1 or 2 wherein said cross linking agent comprises a sebacic acid ester.

34. The method as claimed in claim 1 or 2 wherein the cross-linking agent is trissuccinimdyl aminotriacetate (TSAT) or beta-tris(hydroxylmethylphosphino) propionic acid (THPP).

35. The method of claim 11, wherein said second pH is the same as or higher than said first pH.

36. The process as claimed in claim 11, wherein said cross linking agent comprises a sebacic acid ester.

37. The process as claimed in claim 11, wherein the cross-linking agent is trissuccinimdyl aminotriacetate (TSAT).

38. The barrier of claim 27, wherein said barrier is a barrier for a window or armour.

* * * * *